United States Patent [19]

Gashenko et al.

[11] 4,130,439
[45] Dec. 19, 1978

[54] METHOD OF PREPARING BATCH FOR MANUFACTURE OF CLAY BRICK

[76] Inventors: Stanislav I. Gashenko, ulitsa Gorkogo, 159, kv. 76; Alexandr A. Rogatkin, ulitsa 40 let Sovetskoi Ukrainy, 76, kv. 3; Grigory I. Silakov, ulitsa Yatsenko, 4a, kv. 59; Leonid P. Khlopkov, ulitsa 40 let Sovetskoi Ukrainy, 58, kv. 39, all of Zaporozhie; Sergei G. Nesterovsky, ulitsa D. Donskogo, 4a, kv. 9, Dnepropetrovsk; Andrei I. Starun, ulitsa Ogorodnaya, 91, Dnepropetrovsk; Viktor D. Mironov, ulitsa Kossiora, 1a, kv. 36, Dnepropetrovsk; Gennady D. Dibrov, ulitsa Poligonnaya, 18a, kv. 119, Dnepropetrovsk; Anatoly A. Panasenko, prospekt Vorontsova, 75, kv. 299, Dnepropetrovsk, all of U.S.S.R.

[21] Appl. No.: 771,515

[22] Filed: Feb. 24, 1977

[51] Int. Cl.$^2$ .............................................. C04B 33/00

[52] U.S. Cl. ........................................ 106/67; 106/72
[58] Field of Search ...................... 106/67, 71, 72, 73.6

[56] References Cited

U.S. PATENT DOCUMENTS

| | | | |
|---|---|---|---|
| 1,585,826 | 5/1926 | Betts | 106/67 |
| 1,585,827 | 5/1926 | Betts | 106/67 |

*Primary Examiner*—James Poer
*Attorney, Agent, or Firm*—Robert E. Burns; Emmanuel J. Lobato; Bruce L. Adams

[57] ABSTRACT

The method of preparing a batch for the manufacture of clay bricks consists in that clay is mixed with chloride wastes of non-ferrous metallurgy, that are used as additives in the form of their aqueous solution, added in the quantity of from 5 to 20 per cent with respect to the weight of clay, which is obtained by dissolving said chloride wastes in water and adjusting the pH of the resultant solution to 1-5 and the density of the solution to 1.03-1.1 g/cc, depending on the mineralogical composition of the clay.

5 Claims, No Drawings

METHOD OF PREPARING BATCH FOR MANUFACTURE OF CLAY BRICK

BACKGROUND OF THE INVENTION

The present invention relates to the manufacture of building materials and more particularly it relates to a method of preparing a batch for the manufacture of clay bricks.

Known in the prior art is a method of preparing a charge for the manufacture of bricks by mixing clay with various admixtures that reduce the plasticity of clays, such as sand, chamotte, granulated slag, Wooden sawdust, anthracite, coke, and coals are used as admixtures that burn out in the process of brick firing. Bentonites and sulphite-alcohol liquor are used as plasticizing additives.

The disadvantage of the known method is that the preparation and utilization of numerous additives complicate the process of manufacture of bricks. Moreover, the batch prepared by the known method is not homogeneous and lacks the plasticity required for moulding.

SUMMARY OF THE INVENTION

It is an object of this invention to eliminate these disadvantages.

The specific object of the invention is to simplify the process of preparing a batch for the manufacture of clay bricks and to improve the properties of the batch.

This object is accomplished by the hereinproposed method for preparing a batch for the manufacture of clay brick by mixing clay with an additive; according to the invention, the additive is an aqueous solution of chloride wastes of non-ferrous metallurgy, that is added in the quantity of 5-20 percent with respect to the weight of clay, and is prepared by dissolving said chloride wastes in water and adjusting the solution pH to 1-5 and the density to 1.03-1.1 g/cc., depending on the mineralogical composition of the clay.

The herein-proposed method for preparing a batch is realized as follows.

Finely dispersed chloride wastes of non-ferrous metallurgy are dissolved in water to obtain a concentrated solution. The rising vapour is condensed and returned to the concentrated solution. The obtained solution is now diluted by adjusting the pH to 1-5 and the density to 1.1 g/cc. and added to clay in the quantity of 5-20 percent with respect to the weight of clay, depending on the mineralogical composition of the clay.

The chloride wastes are a finely dispersed material, with particles of the size of 10-100 microns and having the following composition, in percent by weight:

| $TiO_2$ | 6.0–16 | $Al_2O_3$ | 4.2–9.4 | TeO | 0.6–22.0 |
|---|---|---|---|---|---|
| $SiO_2$ | 4.64–10.5 | MgO | 1.24–4.6 | Mn | 0.3–2.8 |
| $Cr_2O_3$ | 1.3–26 | $Nb_2O_5$ | 0.02–0.4 | Cu | 0.3–1.0 |
| CaO | 0.4–0.6 | $V_2O_5$ | 0.6–0.5 | $Ta_2O_5$ | 0.064–0.01 |
| C | 7.75–56.0 | Cl | 4.2–47.1 | | |

The present invention enables the use of wastes of nonferrous metallurgy in the manufacture of clay bricks and solves the problem of utilization of industrial wastes and environmental control.

Utilization of chloride wastes of non-ferrous metallurgy makes it unnecessary to use numerous additives, and, the process steps at which these additives are additionally processed is obviated.

The chloride wastes give the batch the required plasticity and workability. This in turn decreases the load on the equipment; the load on the press is, e.g., decreased by 30-40%.

The utilization of the chloride wastes, according to the invention, increases the compressive strength of bricks 1.2-1.5 times, as compared with the known methods, and the bricks obtained from the batch prepared by the proposed method can be used as walling material that undergoes high stresses, e.g. in multi-storey buildings, chimneys, etc.

For a better understanding of the invention, the following examples of its practical embodiment are given by way of illustration.

EXAMPLE 1

Chloride wastes containing the following chemical constituents (in percent by weight)

| $TiO_2$ | 6.0 | $Nb_2O_5$ | 0.02 |
|---|---|---|---|
| $Al_2O_3$ | 4.2 | Cu | 0.3 |
| TeO | 0.6 | CaO | 0.4 |
| $O_2$ | 4.65 | $V_2O_5$ | 0.06 |
| MgO | 1.24 | $Ta_2O_5$ | 0.018 |
| Mn | 0.3 | C | 7.75 |
| $Cr_2O_3$ | 1.3 | Cl | 24.2 | are dissolved in water to prepare a concentrated solution.

The vapour that is evolved during the dissolution process is condensed and returned to the concentrated solution. The pH of the concentrated solution is adjusted with water to 1.5, and the density to 1.03 g/cc. The obtained solution is delivered into a mixer in the quantity of 5 percent of the weight of clay.

The clay has the following composition, in percent by weight:

| $SiO_2$ | 67.18 | $Al_2O_3$ | 10.59 | CaO | 6–10 |
|---|---|---|---|---|---|
| MgO | 1.63 | $M_2O$ | 3 | $Fe_2O_3$ | 3–4 |
| $TiO_2$ | 0.55 | | | | | loss on ignition, 7.05
plasticity, .79
sintering point, 1020° C.

The obtained batch has improved plastic and moulding properties that ensure effective preparation of clay bricks having the compression strength of 150-160 kgf/sq.cm, flexural strength of 29-31 kgf/sq.cm, water absorptive power 13-14 percent, frost resistance, 25 cycles.

EXAMPLE 2

Chloride wastes containing the following constituents, in percent by weight:

| $TiO_2$ | 10 | $Cr_2O_3$ | 0.1 |
|---|---|---|---|
| $Al_2O_3$ | 7.5 | $Nb_2O_5$ | 0.8 |
| FeO | 12 | Cu | 0.4 |
| $O_2$ | 6 | CaO | 0.5 |
| MgO | 2.2 | $V_2O_5$ | 0.2 |
| Mn | 1.0 | $Ta_2O_5$ | 0.03 |
| C | 20 | Cl | 25 | are dissolved in water to prepare a concentrated solution. The vapour that rises in the dissolution process is condensed and returned into the solution. The concentrated solution is diluted with water to adjust the pH to 3.0 and the density to 1.06 g/cc. The obtained solution is then delivered to the mixer in the quantity of 13 percent of the weight of clay.

The clay has the following chemical composition, in percent by weight:

| SiO$_2$ | 75.4 | Al$_2$O$_3$ | 8.03 | Fe$_2$O$_3$ | 3.23 |
|---|---|---|---|---|---|
| TiO$_2$ | 0.5 | Ca$_2$O$_3$ | 5.54 | MnO | 1.19 |
| K$_2$O | 1.98 | SO$_3$ | 0.107 | | | loss on ignition, 7.36
plasticity, 5.6
sintering point, 980° C.

The resultant batch possesses improved plasticity and moulding properties, that ensure preparation of clay brick having the compressive strength of 112 to 116 kgf/sq.cm, flexural strength of 22 to 24 kgf/sq.cm, and water absorptive power of 15–16%; the frost resistance, 25 cycles.

EXAMPLE 3

Chloride wastes, having the composition, in percent by weight:

| TiO$_2$ | 16 | CrO$_3$ | 0.4 | C | 56.0 |
|---|---|---|---|---|---|
| Al$_2$O$_3$ | 9.4 | Nb$_2$O$_5$ | 1.0 | Cl | 47.0 |
| FeO | 22 | Cu | 0.4 | | |
| O$_2$ | 10.5 | CaO | 0.6 | | |
| MgO | 4.6 | V$_2$O$_5$ | 0.5 | | |
| Mn | 2.3 | Ta$_2$O$_5$ | 0.06 | | | are dissolved in water to prepare a concentrated solution. The vapour that rises during the dissolution process is condensed and returned to the solution. The concentrated solution is diluted with water to adjust the pH to 5.0 and the density to 1.1 g/cc. The obtained solution is added to clay in a mixer in the quantity of 20 percent, calculating with reference to the weight of clay.

The analysis of the clay is as follows, in percent by weight:

| SiO$_2$ | 60.3–64.14 |
|---|---|
| Al$_2$O$_3$ | 8.7–11.5 |
| Fe$_2$O$_3$ | 2.8–4.8 |
| CaO | 6.49–12.25 |
| MgO | 1.08–2.07 | loss on ignition, 7.96–12.36 percent
plasticity, 12.1
sintering point, 1050° C.

The resultant batch possesses improved plastic and moulding properties that ensure preparation of clay brick having the compressive strength of 210–250 kgf/sq.cm, flexural strength of 34–41 kgf/sq.cm., water absorbing power of 12–13 percent, and frost resistance, 35 cycles.

What is claimed is:

1. A method of preparing a batch of clay for the manufacture of clay bricks, wherein the properties of said batch are improved, which comprises mixing said clay with an aqueous solution of the chloride wastes of non-ferrous metallurgy in a quantity of 5–20 percent based on the weight of said clay, wherein said aqueous solution of chloride wastes is obtained by dissolving chloride wastes of non-ferrous metallurgy having a particle size of about 10–100 microns in water and adjusting the pH of the obtained solution to 1–5 and the density of 1.03–1.1 g./cc., depending on the mineralogical composition of the clay.

2. A method according to claim 1, in which said chloride wastes contain about 6–16% by weight of TiO$_2$ and about 1.24–4.6% by weight of MgO.

3. A method of using the chloride wastes obtained in nonferrous metallurgy to improve the properties of a batch used for manufacture of clay brick, comprising
dissolving said chloride wastes in water and adjusting the pH of the resulting aqueous solution to a pH of about 1–5,
adjusting the density of the resulting aqueous solution to about 1.03–1.1 g./cc. and then
adding said aqueous solution of said choride wastes to said batch used for the manufacture of clay bricks.

4. A clay batch composition for the manufacture of clay bricks having improved plasticity and workability comprising said clay batch in admixture with an aqueous solution of chloride wastes of non-ferrous metallurgy, said chloride wastes being present in an amount of 5 to 20% by weight based on the weight of said clay and said solution of chloride wastes having a pH of 1–5 and a density of 1.03 to 1.1 g./cc.

5. A clay batch according to claim 4, in which said chloride wates contain about 6–16% by weight of TiO$_2$ and about 1.24–4.6% by weight of MgO.

* * * * *